Jan. 17, 1967 W. R. WEDMORE 3,299,220

PROGRAMMED DIAGNOSTIC EQUIPMENT FOR A COMMUNICATION SWITCHING SYSTEM

Filed May 8, 1963 9 Sheets-Sheet 1

FIG. I, FIG. 10

INVENTOR.
William R. Wedmore

BY C. A. Gullbrandsen
ATTY.

Jan. 17, 1967 W. R. WEDMORE 3,299,220

PROGRAMMED DIAGNOSTIC EQUIPMENT FOR A COMMUNICATION SWITCHING SYSTEM

Filed May 8, 1963 9 Sheets-Sheet 5

Jan. 17, 1967 W. R. WEDMORE 3,299,220

PROGRAMMED DIAGNOSTIC EQUIPMENT FOR A COMMUNICATION SWITCHING SYSTEM

Filed May 8, 1963 9 Sheets-Sheet 8

Jan. 17, 1967 W. R. WEDMORE 3,299,220

PROGRAMMED DIAGNOSTIC EQUIPMENT FOR A COMMUNICATION SWITCHING SYSTEM

Filed May 8, 1963 9 Sheets-Sheet 9

United States Patent Office 3,299,220

Patented Jan. 17, 1967

3,299,220

PROGRAMMED DIAGNOSTIC EQUIPMENT FOR A COMMUNICATION SWITCHING SYSTEM

William R. Wedmore, Lombard, Ill., assignor to Automatic Electric Laboratories, Inc., Northlake, Ill., a corporation of Delaware Filed May 8, 1963, Ser. No. 278,954
6 Claims. (Cl. 179—175.2)

This invention relates to supervisory apparatus for telephone systems, being concerned more particularly with apparatus for supervising the operations of the marker, register-sender and translator apparatus provided for the common use of the exchange in extending a telephone connection.

A principal object of the invention is to provide an apparatus for routine use in checking the response of any selected unit of exchange apparatus.

A related object of the invention is to provide reliable and economical means for creating a record of a faulty unit of exchange apparatus.

A further object of the invention is to provide means operable to ascertain the location of a fault causing a particular exchange unit to malfunction, and to provide suitable alarm signals.

The invention has particular applicability to a system employing a crosspoint switching matrix controlled by line and group selector markers in cooperation with register-senders and translators. The system arrangement and components of such a system may be generally similar to those described in the following patent applications.

K. K. Spellnes, Communication Switching System, Ser. No. 230,887, filed October 16, 1962, now U.S. Patent No. 3,170,041 issued February 16, 1965.

K. E. Prescher et al., Communication Switching System Common Control, Ser. No. 231,625, filed Oct. 19, 1962, now U.S. Patent No. 3,173,994, issued Mar. 16, 1965.

M. H. Esperseth et al., Communication Switching System, Ser. No. 240,497, filed November 28, 1962.

J. R. Maneschi et al., Magnetic Drum Translator, Ser. No. 268,384, filed March 27, 1963.

The above discloses a system for which this control center was designed, using solid-state electronic circuits for common-control functions, and electromechanial devices for switching the transmission path and for massive terminal-grouping operations, where mechanical methods are superior. The control concept is one of common control by functional division, as contrasted with central common control, or common control by stage. Each functional block is an autonomous control entity, containing its own clock and operating asynchronously with the rest of the system. The system contains five such functional divisions:

(1) The Line Group Marker

This unit establishes the connection between subscribers' lines and originating or terminating junctors where the direct-line control functions such as transmission-battery feed, ringing voltage, busy tone, and answer supervision are supplied.

(2) The Group Selector Marker

This unit establishes the connection from the originating junctors to the terminating junctors, or to trunks leading out of the exchange.

(3) The Trunk Marker

This unit establishes the connection between the trunks incoming from outside the exchange and the register junctors.

(4) The Register-Sender Group

This equipment accumulates digits dialed by the subscriber and has three translated to switching language for use by the markers. It is here that subscriber classes of service, direct distance dialing features, and exotic control requirements are implemented.

(5) The Translator

Basically, this unit is a magnetic-drum library, relating the telephone subscriber's directory number to the switching coordinates within the system.

To implement the system logic family of solid-state circuits consisting of four resistor-transistor logic gates having different fan-in fan-out ratios, a set-reset flip-flop with dual set and reset inputs, and a gated pulse amplifies for clock control and distribution has been used.

In a common-control system the basic concern from the maintenance standpoint is the catastrophic nature of even a minor circuit malfunction. In this system the problem has been alleviated by dividing the control functions into functional blocks. Each section consists of two logic units operating in tandem, and either one may be temporarily removed from service without serious consequences.

Telephone central-office equipment is custom-engineered to fit individual operating company requirements. Amounts and configuration of equipment vary widely, as do the operational features supplied with the system. Depreciation periods in the industry average 25 to 30 years, during which periodic changes in operating procedure and advances in technology are bound to occur, necessitating additions to and modifications of the central-office equipment. Any machinery provided for automatic testing and fault diagnosis must therefore be applicable to any combination of initial equipment, and be capable of assimilating gross changes and expansion of the surrounding system without requiring extensive re-design.

Each of these units must execute a number of progressive steps, each in cooperation with some other unit, to complete its assigned function. It has been found that a fault occasionally develops, which stops the noted progressive action and thus could tend to hold the individual unit and the associated unit indefinitely. To partially overcome this fault the individual functional units are arranged to self time the progressive steps, and upon the lapse of an excessive period to request aid.

Accordingly, a feature of this inventon is an allotter within the control center that operates to scan each of the functional units for a fault conditon, and which upon encountering a faulty unit connects thereto and informs the control circuitry of the functional classification of the unit.

Further, according to the invention, a common access path is utilized. This path however is not complete to all the functional units until the allotter confirms the connection.

Still another feature of this invention is the cooperative use of the bank selector for traffic supervisory purposes.

The above mentioned and other objects and features of this invention and the manner of attaining them will become more apparent, and the invention itself will be best understood, by reference to the following description of an embodiment of the invention taken in conjunction with the accompanying drawings comprising FIGS. 1-10 wherein:

FIGS. 1 to 7 comprise a detailed block diagram of a crosspoint switching exchange.

FIG. 10 shows how FIGS. 1 to 8 are to be arranged.

SYSTEM ORGANIZATION

Figure 1:
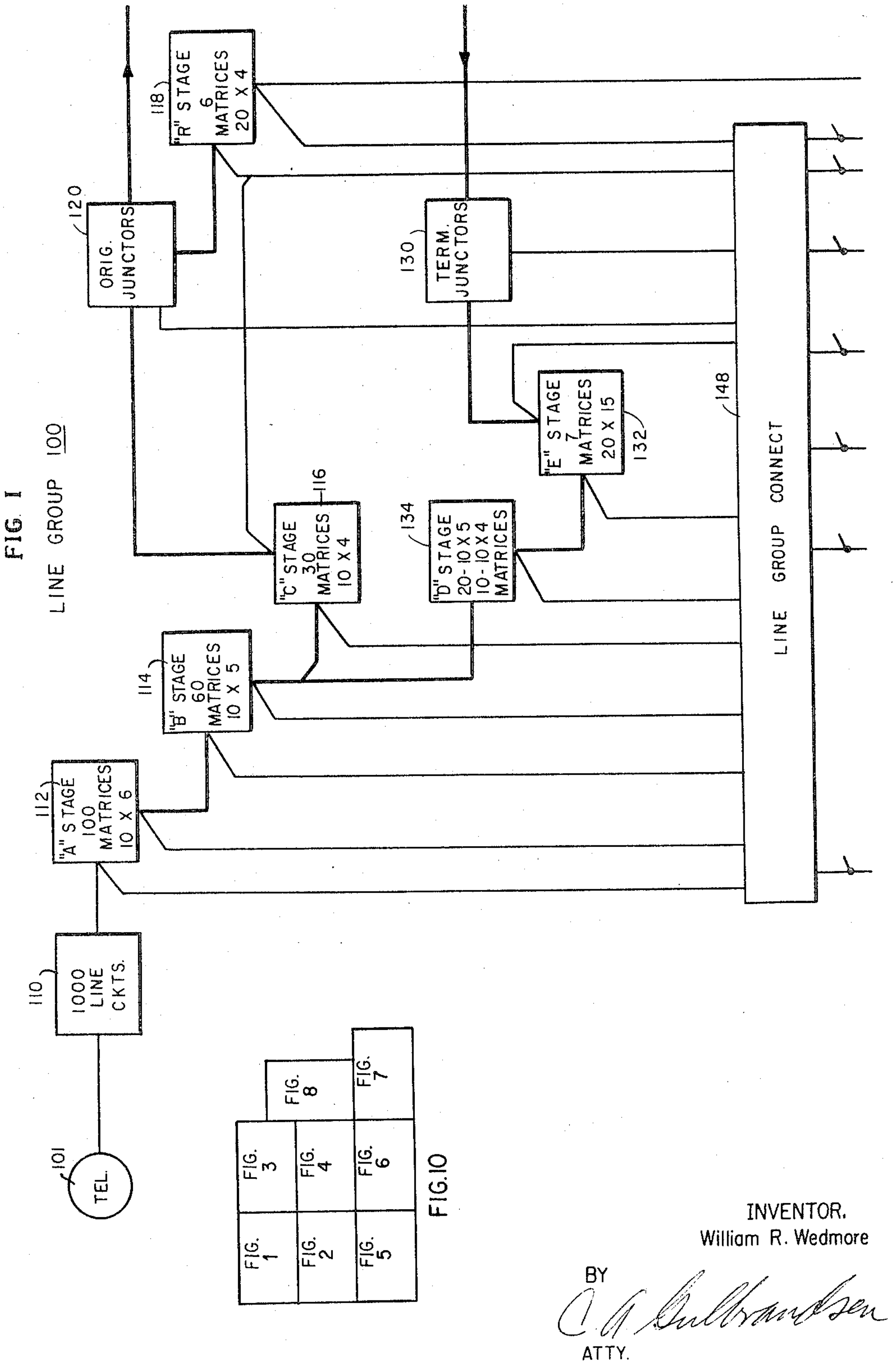
Figure 2:
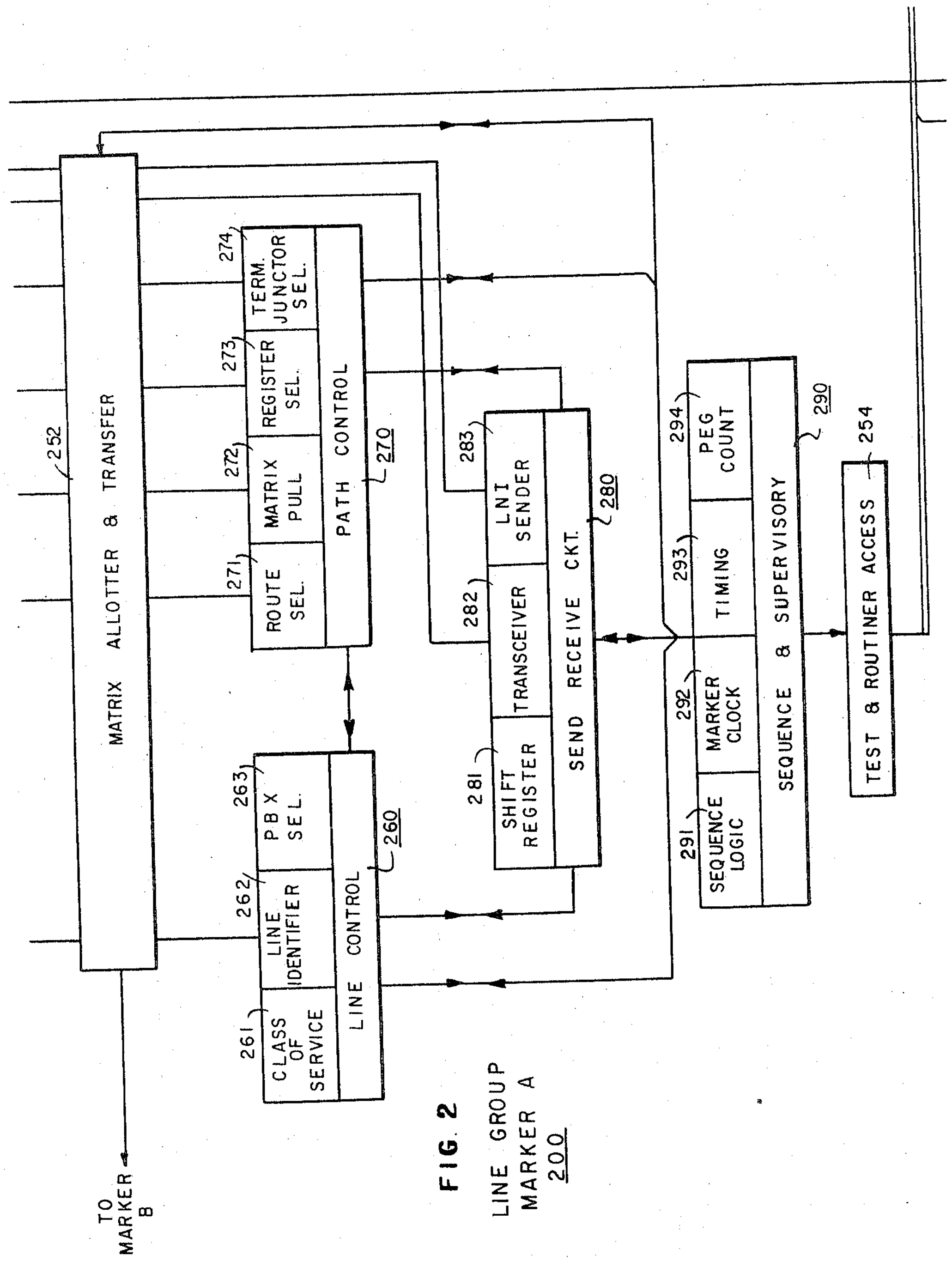
Figure 3:
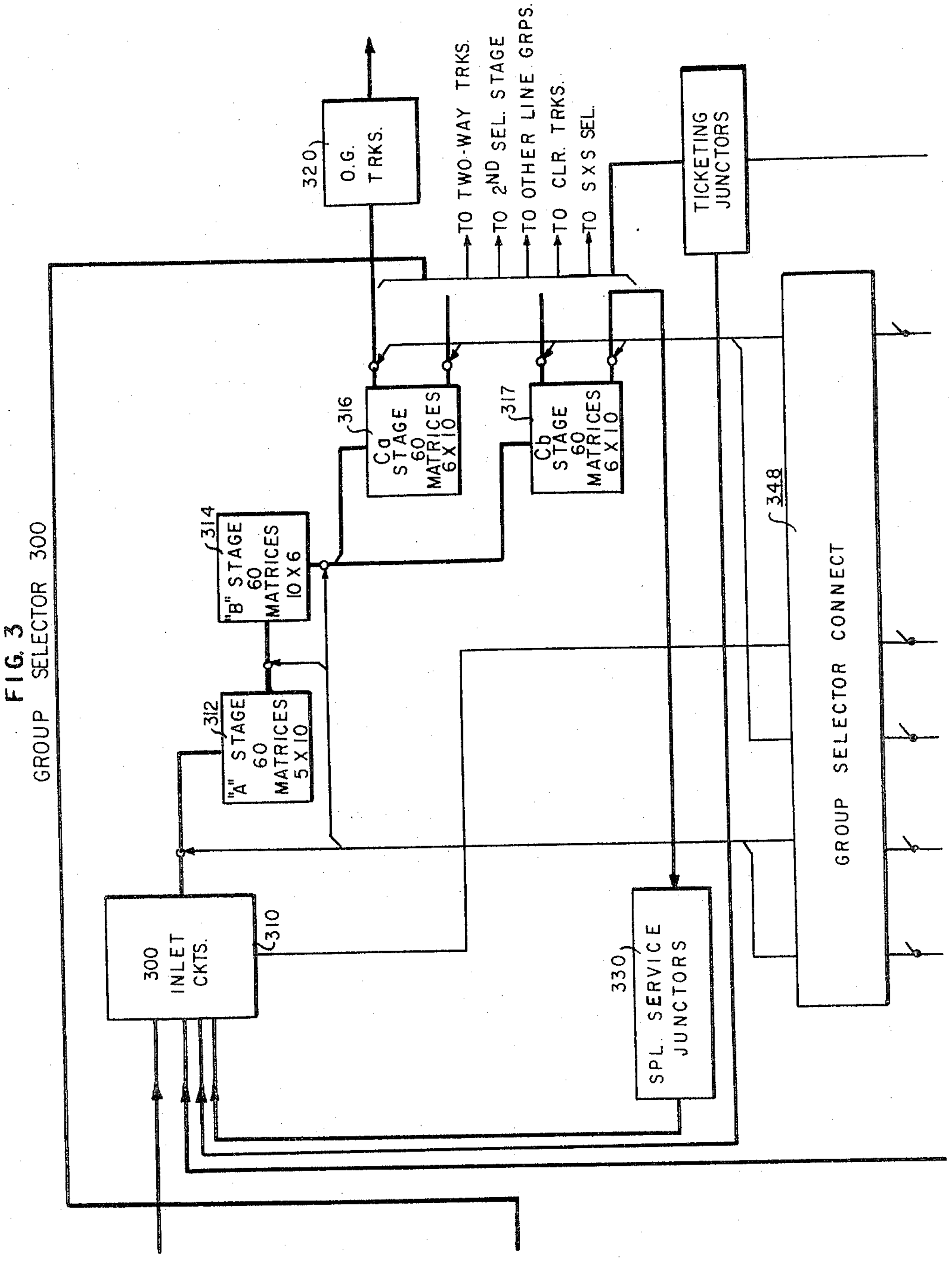
Figure 4:
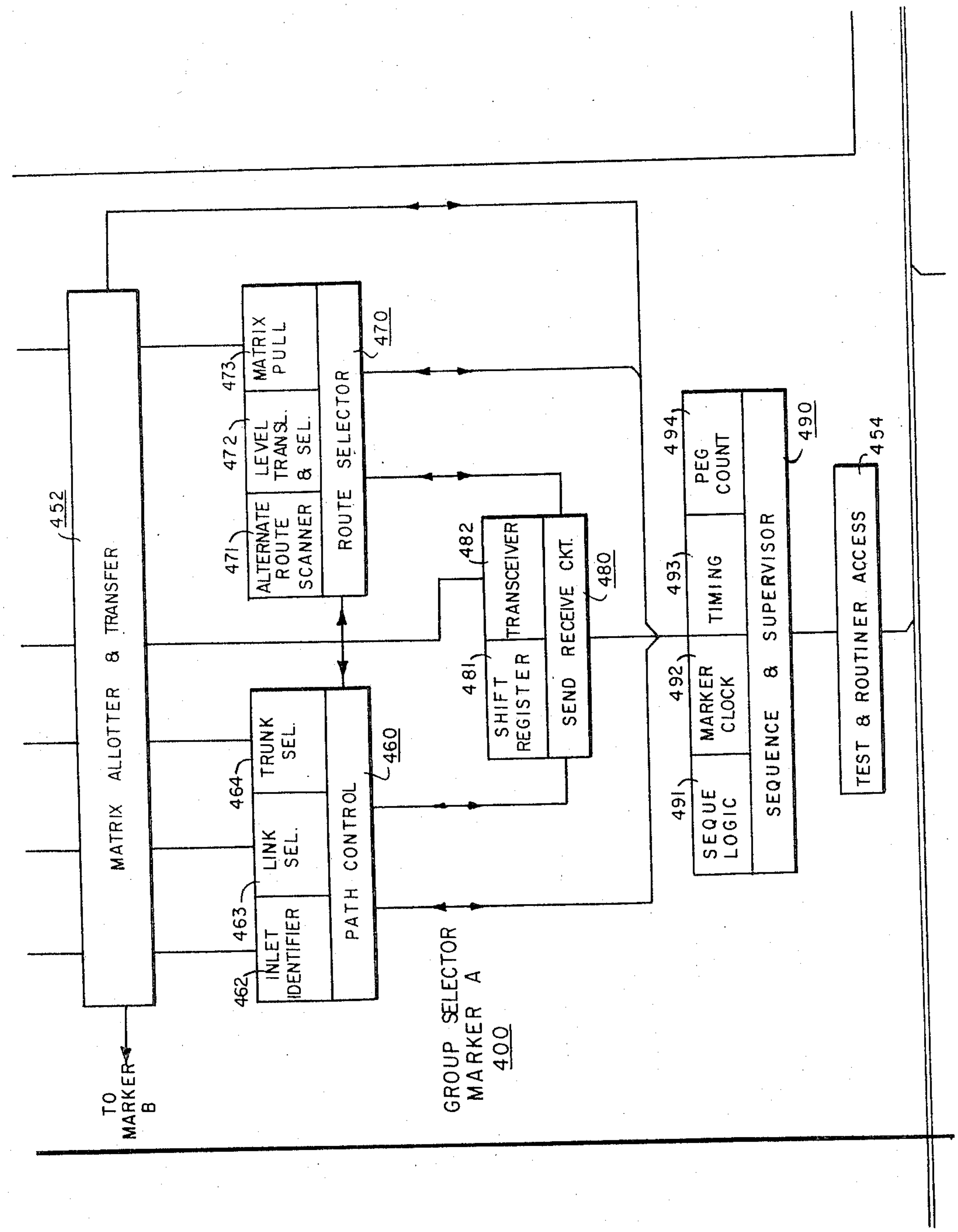
Figure 5:
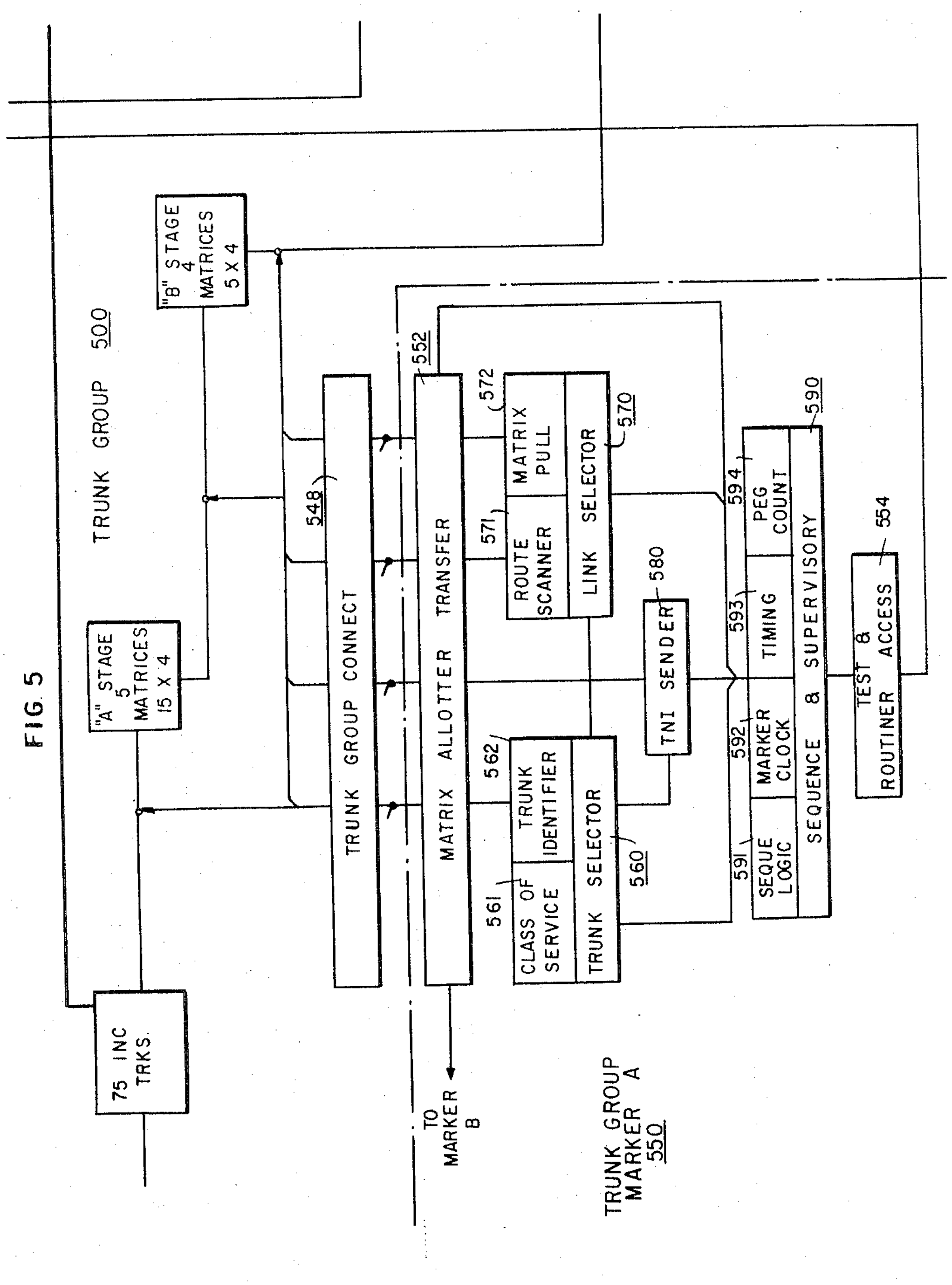
Figure 6:
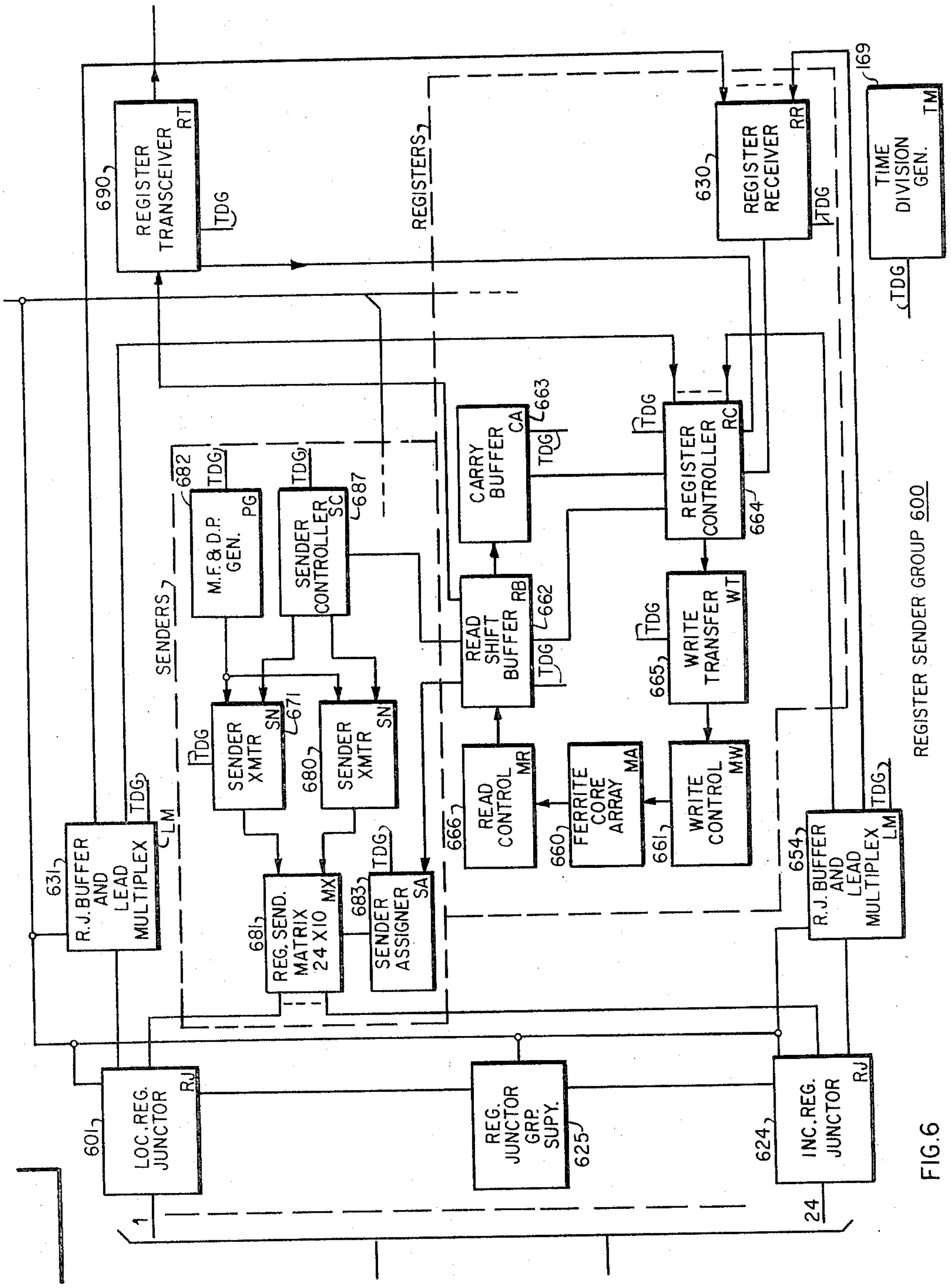
Figure 7:
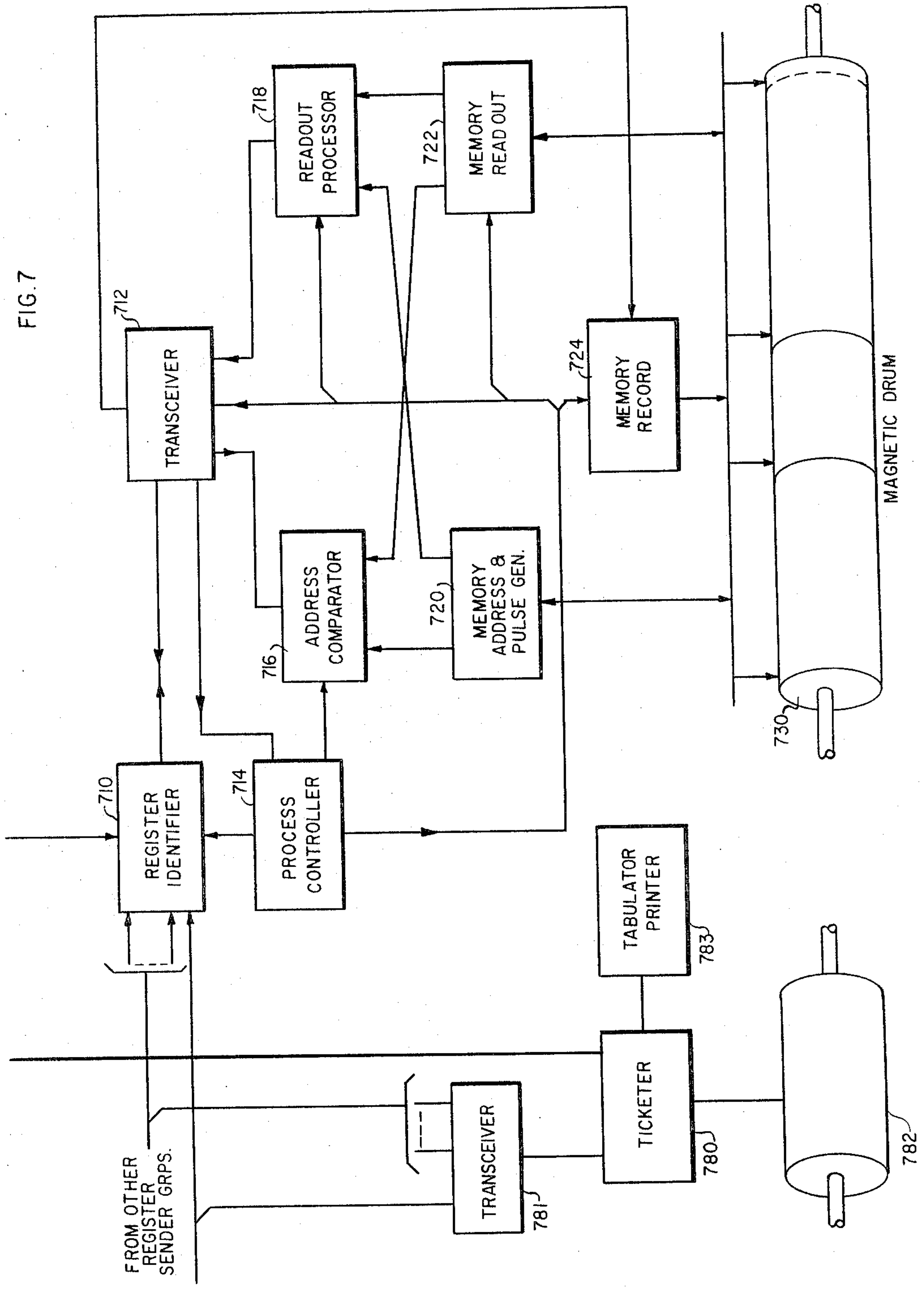

Referring to FIGS. 1–7, the system consists of the line group 100, group selector 300, register-sender group 600, and the translator 700. There is also a trunk group 500 which provides access from incoming trunks to the registers, and a control center 800 which contains a special computer for operation analysis and recording, and program upgrading equipment.

All of the electronic equipment is furnished in duplicate, for instance, two line group markers 200 may serve up to ten line groups and two group selector markers 400 may serve up to ten group selectors. A minimum of two register-sender groups 600 will be equipped per office and the translator 700, including the magnetic drum 730 and logic circuitry, will always be furnished in pairs per ten thousand directory numbers.

Time division techniques are used in the register-sender group 600 and in the translator 700. The markers are designed on an electronic basis and semi-conductor circuitry is employed throughout the system. A ferrite core memory 660 is used for temporary storage whereas the magnetic drum 730 is used for semi-permanent storage.

The space division switching elements of the system consists of reed relay matrix assemblies.

AUTOMATIC MAINTENANCE ADMINISTRATION

The control center 800 is designed for the purpose of introducing automation into the maintenance administration of the switchboard. The control console has direct access to all of the stored system program which is written on the magnetic drum. By means of an electric typewriter, this program may be changed by the maintenance personnel to accomplish quickly, for example, subscriber moves, re-routing of calls to intercept, transfer of a call to another line, absent subscriber service, toll restriction, line busy recording, etc. This method of operation has eliminated the need for an IDF and the labor of changing jumper wires.

The electric typewriter contains a tape punch as well as printer and thus provides a copy of the information written onto the magnetic drum.

THE LINE GROUP

*Line group matrix*

This section of the system may be thought of as a large switching unit capable of connecting any one of the 1000 lines originating calls to any one of 120 circuits called originating junctors 120. Likewise, this unit is capable of connecting any one of 120 circuits called terminating junctors 130 and representing incoming calls to any one of the 1000 lines served by this line group. Crosspoint matrices constitute the switching network and provide concentration going outward for originating calls, and expansion going inward for terminating calls. For practical and economic reasons, three stages A, B, and C, make up the outgoing switching stages. Four stages, E, D, B and A, make up the incoming switching stages. The 1000 subscribers lines divided into ten groups of 100 each, are located on the main distributing frame and from there are jumpered directly to the A stage 112. No intermediate distributing frame is required. The A stage has 600 outlets or links (60 for each of the ten "hundreds" group) appearing as inlets to the B stage 114. The B stage, in turn, has 300 links (30 for each "hundreds" group) appearing as inlets to the C stage 116. The C stage has 120 links to originating junctors 120. The originating junctors provide by-paths via the "R" stage to twenty-four registers and also provide access to the inlet circuits 310 of the group selector 300. With this switching configuration, a fully equipped line group is capable of handling a maximum traffic of three unit calls per line in each direction at a grade of service better than 0.01.

The switching stage matrices are made up of crosspoint reed relays, 15,000 for a fully equipped 1000 line group of 15 per line (12 per line for two unit calls per line). The reed relay coil has two windings, an operate (or pull) winding and a hold winding, and has three contacts. Two of the contacts switch the transmission loop. A third locks the hold winding to the sleeve or "C" lead.

The subscriber's line equipment is similar to a conventional line and cut-off circuit except that reed relays are used and fewer contacts are required. Reed relays were chosen over a static line circuit for simplicity and reliability of operation and for electrical isolation of electronic apparatus from outside plant disturbances.

A maximum of thiry subscribers in a given hundreds group may be engaged in different conversations at one time. One originating and one terminating junctor, two each of A and B crosspoint reed relays, and one each of D, C, and E crosspoint reed relays are held in the line group per conversion. Registers are held only during dialing.

The originating and terminating junctors mentioned earlier are reed relay circuits performing several functions. The originating junctor provides loop splitting facilities for an originating call. Initially, a transmission path is provided from the calling line to register and an additional path is provided from register to group selector for early outpulsing. When the called line is reached, the originating junctor switches the calling line through to the terminating junctor via the group selector. The circuit also provides a busy tone bridge in the event of no link availability.

The terminating junctor performs functions necessary to extend the call to a called subscriber. It provides a path into the line group marker for signaling between the code receiver in the marker and the sender circuit. The circuit provides regular or party line ringing controls, ring back tone, and ring cut-off controls. When line busy is encountered, busy tone is provided at this point. It provides transmission battery feed for both called and calling parties. On test calls and busy verification calls, the junctor removes the battery feeds and switches the calling line metallically through to the called line. For official calls, answer supervision is disabled within the junctor to prevent charging of the calling end. Thus, it is seen that special service calls are also handled by the terminating junctor via the regular switching network eliminating the need for a special switch train.

*Line group marker*

Two markers 200 are always provided and the 1000 line groups are divided between the two up to a maximum of five line groups per marker. Each marker serves its associated line group matrices on an allotted basis, but, is also capable of assuming the load of its companion marker.

In its idle state, a marker continuously scans for requests for service from the line groups with which it is associated. Upon recognizing a call, either originating or terminating, in a particular line group, it locks out all other groups via its allotter and allows the connect circuitry of the selected group to switch in the matrix leads in the marker for processing. Approximately 400 leads are so controlled. All calls in the allotted line group are processed before the marker returns to its idle state to serve other groups.

When connected to a line group, the marker has two primary functions, connect a line originating a call through the matrices and originating junctor to a register and to connect a terminating junctor (representing an incoming call) through the matrices to the called line. Both reed relays and electronic circuitry are used to perform these jobs. The electronic circuitry provides all logic and scanning operations requiring high speed. Reed relays are used merely for connecting purposes, to switch in the necessary groups of leads into the electronic circuitry for analysis. With this combination of components, the processing of a request for service by the line group marker is accomplished in approximately 100 milliseconds.

For each function, the marker performs several tasks. In general, for originating traffic, it must provide line number identification, pathfinding and route selection, sending of line number identification, class of service (225), and line group identity. For terminating traffic, it must provide terminating junctor identification, transceiver for communicating with the sender circuit, access to called line for busy test, PBX selection, and pathfinding and route selection.

The tasks performed by the marker in processing a call are controlled by a sequence and supervisory circuit 290. This control may be compared to a programmed computer in that the marker follows a fixed plan of operation. All marker operations are governed by this control.

Included is the clock circuit which provides pulses to synchronize operations within the marker and the timing circuitry which is used to generate various time-out periods such as that provided between a reed relay operation and a succeeding electronic scanning operation. Once the supervisory control recognizes a request for service, either terminating or originating, it will process this call from beginning to end, locking out all other calls.

THE GROUP SELECTOR

*Group selector matrix*

The intermediate switching functions of the system are performed by a group selector 300. Three stages of crosspoint switches are provided. The first switching stage 312, the A stage, contains 60 cards of 50 crosspoints, each arranged in a 5 x 10 matrix. This switching matrix is associated with the inlet circuit 310 line and cut-off reed relays to the group selector. The second switching stage 314, the B stage, contains 60 cards of 60 crosspoints each in a 10 x 6 matrix. The third stage 316, the C stage, uses a basic arrangement of 60 crosspoints in a 6 x 10 matrix to provide 600 outlets. In addition, a second group 317 of 60 switches may be added to expand the outlet capability of 1200 in case of a very large central office. The group selector has 300 inlets 310 serving the originating junctors in the line groups and incoming trunks.

The outlets of the group selector are arranged as 120 levels of 10 trunks each. These levels may be combined to accommodate trunk groups of any size.

*Group selector marker*

The operation of the group selector is controlled by an electronic marker. The marker has control of all crosspoints in the group selector and sets up calls on a one-at-a-time basis. The marker operates in response to selection digits received electronically in its transceiver from the register-sender group. The holding time of the marker is approximately 100 milliseconds.

Because of the common control nature of the marker, and its high speed, it is possible to provide switching features that would otherwise require a large investment in the form of additional switching stages.

Alternate route selection is performed by the group selector marker. In selecting an alternate route, the marker will identify this trunk group as one that requires a change in the digits to be outpulsed or a change in the type of outpulsing, multi-frequency or dial pulse. In this case, the marker will send back instruction regarding digit changes or a command for the sender to change the type of pulsing. If no change is required, the marker can switch the call through to an alternate trunk without changing the sender's instructions.

Insertion junctors 330, shown on the system block diagram at the outlet of the group selector, are used for add-on conference calls, coin-box completing, PPCS, annoyance calls, etc. These junctors may be inserted into connections on command from the program written on the magnetic drum.

The group selector marker is equipped to identify ticketing trunks and relay this identity to the register-sender group. This permits ticketer storage functions to be placed on the magnetic drum eliminating the need for storage facilities in the ticketing trunk.

THE TRUNK GROUP

*Trunk group matrix*

The trunk group 500 provides access for incoming trunks from outside of the office or for special intra-office trunks such as operator or wire chief. A trunk group matrix is capable of connecting any one of 75 incoming trunks to any one of sixteen registers on a single output level basis. All trunks in the same group of 75 are either dial pulse (DP) or multi-frequency (MF). Trunk group matrices are added as required to handle large numbers of incoming trunks. Each matrix is independently controlled but outlets are graded to provide sharing of registers.

The trunk group matrix is comparable to the R stage of the line group matrix. The incoming trunk is equipped with loop splitting facilities, and access is provided from a trunk to a register and an additional path is provided from the register-sender to an inlet circuit of the group selector. When the call has reached its destination, the incoming trunk switches through to the established path and the crosspoints of the trunk group matrix associated with this call are released by the register-sender.

The matrix consists of a two stage network of crosspoint switches. The incoming trunks, divided into five groups of fifteen trunks each, appear as inlets to the first stage, the A stage. The A stage has twenty outlets or links (four for each of the five groups) appearing as inlets to the B stage. The B stage has sixteen links to registers. Both stages use a basic arrangement of twenty crosspoint switches in a 4 x 15 matrix unit Three units are wired together to give the 4 x 15 matrix unit used in the A stage, while four single units make up the B stage.

*Trunk group marker*

The operation of the trunk group matrix is controlled by an electronic marker 550 which has control of all reed relays and sets up connections on a one-at-a-time basis. The marker operates in response to a call for service from a trunk group and sets up a path based on information concerning the condition of a register junctor (busy or idle) and the condition of any link (busy or idle). The holding time of the marker is approximately 50 milliseconds which is well within the interdigital switching time of any direct controlled system.

THE REGISTER-SENDER

The register-sender group 600 is a time shared, common control unit with the ability to register and process twenty-four simultaneous calls. The fully equipped unit consists of twenty-four register and ten senders.

The registers operate in a time division mode. There is one register junctor for every register in the group. Real time to time division entry is provided by this circuit. A common control unit comprises time divided circuits which are shared by all twenty-four registers. These circuits are used by each register in turn and are organized to provide the needed registration and process control for the registers. A temporary storage facility is provided for the register group. Each register has an assigned storage area wherein all register information is placed to allow time division operation by the common control. A folded word oriented ferrite core memory is used for this purpose.

The extension of the proper switching digits, to the line or trunk selection stages of the system and to other connecting exchanges, is accomplished with a group of ten senders. These senders operate under the control of the registers and are used to transmit information in a dial pulse, multi-frequency, or code pulse manner.

Communication with the system translators, line group markers, trunk markers, and group selector markers is accomplished by high speed serial transfer of digital information using di-phase.

THE TRANSLATOR

The translators 700 of the system provide semi-permanent storage used by the system to direct the extension of telephone calls in accordance with the subscriber dialed digits.

A pair of translators are provided for each 10,000 directory numbers served by the office. Each translator of the pair shares the traffic load. One of the pair may be taken out of operation for maintenance and all traffic switched to the other without degrading the grade of service. Expansion capability up to 60,000 directory numbers is provided for the office.

Each translator can be accessed from twenty register-sender groups and a supervisory console on a one-at-a-time basis. Four basic types of translations are processed.

(1) Directory Number Translations (DNT)

The directory number of the called party is translated into switching instructions to enable the register-sender to direct the routing of the call to its destination. The switching instructions contain the equipment location of the called telephone line and the party ringing instructions.

(2) Line Number Translation (LNT)

The calling party's line identification is translated into the calling party's directory number. The line number translations provide automatic number identification (ANI) for all one and two party lines.

(3) Code Translations

The called area, office, or special service code is translated into switching instructions. The translation capabilities required of control switching point (CSP) in the direct distance dialing (DDD) network are provided.

(4) Special Feature

Special switching instructions are generated to provide such features as home extension intercom, repertory dialing, automatic call transfer, and other special features.

Information storage is provided by magnetic drums on the basis of one drum per translator. Memory words are recorded on the drum surface from a supervisory console, by simply typing the memory word and appropriate memory address at the console typewriter. This directory number and/or code translation can be added or existing translations altered with a minimum of maintenance effort.

Each drum provides 600,000 bits of information storage. Information is represented in digital form using a four bit binary coding. The magnetic drum is 10 inches in diameter and provided with 150 tracks. Each track stores 4000 bits with a packing density of approximately 130 bits per inch. The drum rotates at 1800 r.p.m. and provides an average access time of approximately 16 milliseconds. The basic time interval of 8.1 microseconds for the system logic is derived from recorded clock tracks. The recording technique employed is return-to-zero (RZ). Reading and writing functions are performed by one fixed read and write head per track. Adjustable register heads are provided for the clock tracks.

Memory words are recorded in parallel along the axis of the drum. Each memory word consists of 40 bits, thus occupying one bit in each of 40 tracks. Three segments along the drum axis with each segment made up of 40 tracks provides storage for 12,000 memory words. The memory words are addressed consecutively around the drum circumference with the first 4000 addresses located in segment one, the second 4000 addresses in segment two, and the third 4000 addresses in segment three.

The drum access circuitry, consisting of read and write amplifiers, all transistorized, are mounted on printed circuit cards in close proximity to the magnetic heads. All logic operations are accomplished through the use of transistorized standard circuits, with a small number of special circuits for pulse generation, shaping, distribution, and buffering.

*Circuit description*

Memory address and pulse generator provide a sequential count of the units, tens, hundreds and thousands digit of the calling and called subscriber along with the various timing pulses, strobe pulses, and write pulses to be used in the system.

The memory readout circuit provides drum segment selection for the read operation and gates information into a buffer circuit for distribution to other circuits.

Memory record circuit provides drum segment selection for the write operation obtaining the information to be placed on the drum directly from the access register.

A means for identifying and connecting a register-sender group or the control console to an idle translator is provided for by the register identifier circuit.

The readout processor provides the control needed for proper transfer of the translated information read from the permanent memory, and the means for processing this information prior to its return to the register-sender group.

The transceiver circuit provides a means of communication between the translator and the register-sender or the console. Also, it provides a temporary storage for the incoming and outgoing information during the process of translation.

Based on incoming information, the process controller circuit selects a given translation (directory numbers, line numbers, code) and generates logic commands to control the sequential process of all circuits involved in the given translation.

The address comparator circuit provides indication of coincidence between the incoming information and the address of the permanent memory. Upon acknowledgement of the coincidence, respective information is read out from the permanent storage.

*Organization of the control center*

The control center serves as a focal point for maintenance and observation of the exchange. It has four primary functions:

(1) Observation of traffic through the exchange
(2) Routine testing for preventive maintenance
(3) Fault diagnosis and localization
(4) Updating translation records The control center is a stored-program data-processing unit. Its memory is a sequentially addressed magnetic drum; this method is attractive, since the required memory is obtained by using tracks of the drum that is already supplied for the translator unit. In a typical installation, twenty drum tracks are set aside for control center use, each track consisting of 4096 bits.

The control center may be divided into four functional parts:

(1) Processor
(2) Maintenance Console (3) Translator Console
(4) Input/Output device and control The processor comprises the necessary data registers and logic, for operation as a stored-program data-processing unit. It contains some 4000 transistors, and fills an equipment frame of about 400 printed-circuit cards.

The maintenance console 8CC is housed in a small, sloping-front cabinet, intended for desk-top mounting. It contains about 60 incandescent lamps for observation of processor operation, and a number of push keys for manual operations. Standard telephone-type components are used and the console resembles a modern P–A–B–X attendant cabinet.

The translator console 8TC closely resembles the maintenance console in form, and contains the same number of lamps and keys, permitting observation of translator operation and manual access to the magnetic drum translator for maintenance and up-dating purposes.

The input/output device is a FRIDEN FLEXOWRITER equipped with an eight-level paper-tape reader and punch. The FLEXOWRITER is shared by the two console circuits for communication with the translator drum and the control center processor.

The console units and FLEXOWRITER may be mounted on a standard office desk, with an oversize top to provide working space.

CONNECTION TO THE EXCHANGE

To keep the number of conductors to a minimum, the control center is connected to the exchange by a cable which is multipled to all units as shown in FIGURES 1 to 7. Included in this cabling is one conductor per unit for a call-signal lead and one conductor per unit as an access lead. The remaining conductors of the access cable (some 100) permit connection between the data registers 8IR1–8IRN of the control center processor and each of the exchanger equipment units, through core reed relays provided in each unit. To avoid noise sensitivity, the leads between the control center and the exchange system units are isolated with core reed relays. A simplified schematic of the complete access circuit is shown in FIGURES 8 and 9.

In the idle condition the scan register 8SR sequentially interrogates each exchange unit for a possible fault condition. If a unit indicates a fault, the scanning operation stops, and access is made to the faulty unit. The unit is now connected to the data bus, which is divided into two parts. A "command" bus, relaying instructions to the unit under test, and an "information" bus, returning unit test points for observation by the control center. The core reed relays shown provide the necessary load buffering and because of their relatively long response time (one to two milliseconds), effectively isolate the bus from impulse noise.

THE CONTROL CENTER PROCESSOR

Figure 8:
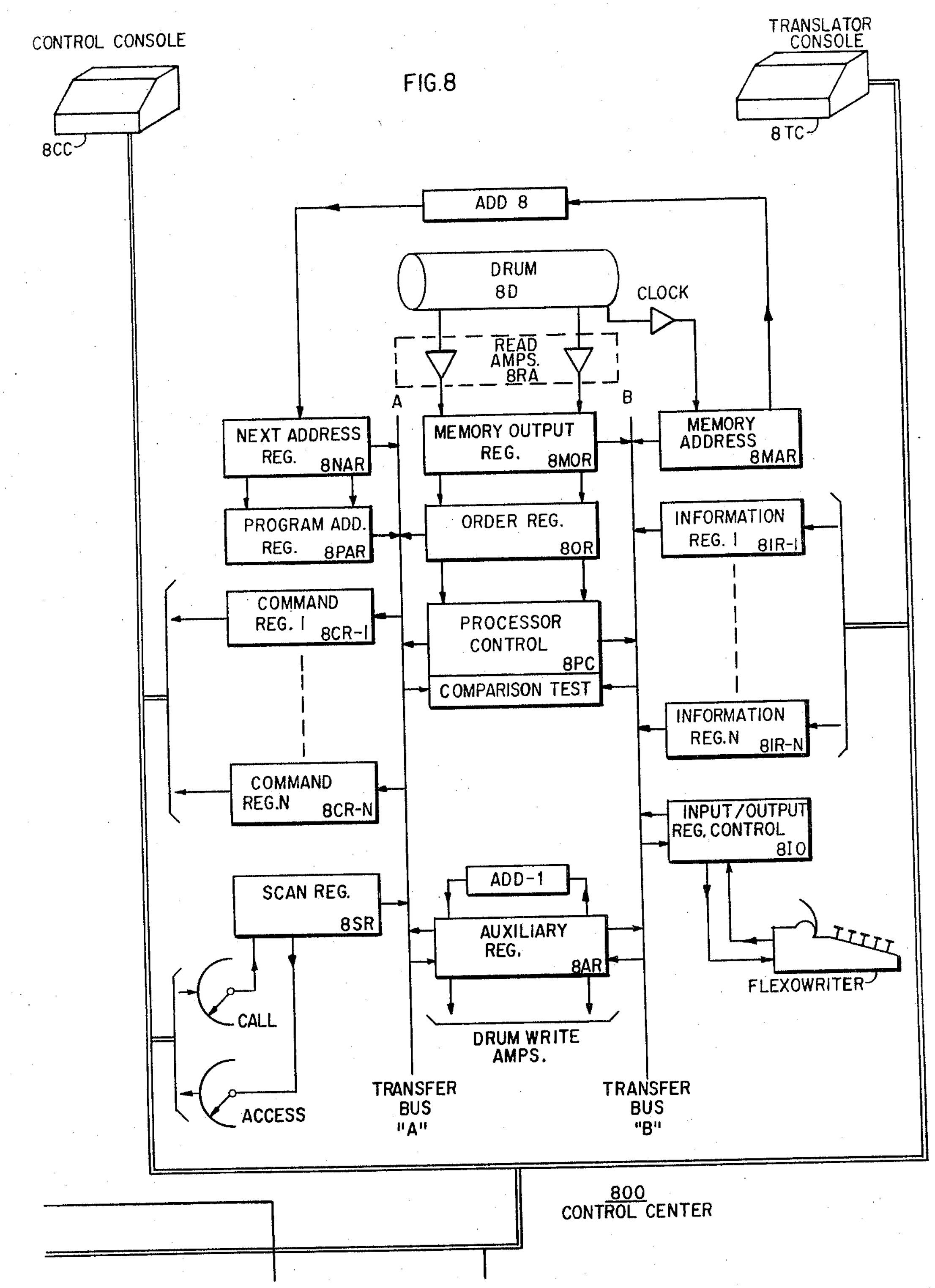
FIG. 8 is a block diagram of the Control-Center showing the functional interconnections.
Figure 9:
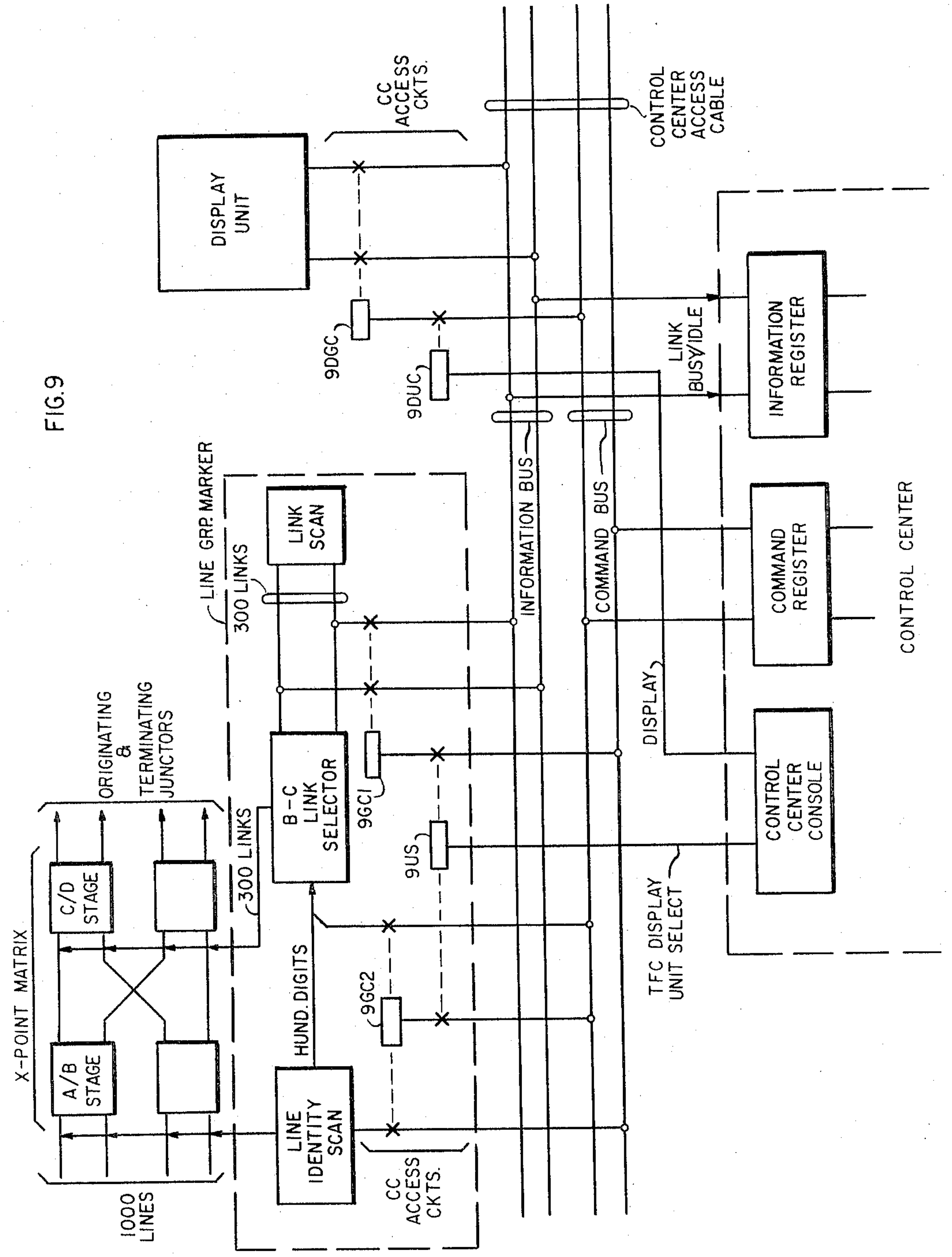
FIG. 9 is a schematic and block diagram of the manner in which a traffic count is taken.

A block diagram of the control center processor is shown in FIGURE 8. Most of the diagnostic subroutines used by the control center are comparisons between signals received from the unit under test (in response to stimulus over the command bus from the command registers 8CR1–8CRN) and a known pattern stored in the memory. The processor is built around two transfer buses connecting to the various registers, and a processor control circuit 8PC which contains, in addition to the operational code logic, a parity-checking circuit capable of testing for total and partial equivalence between the two buses. Any register that communicates with bus A may be compared with any register on bus B.

The drum memory 8D employed includes a clock track and an indexing bit. These are used to drive a memory-address register 8MAR of twelve bits, which indicates at all times the position of the drum. Coupled to the memory-address register is the next address register 8NAR, containing the address of the next instruction to be read from the drum after the functions of the current instruction are completed. The clock rate of the drum is approximately 125 kcs., and to give adequate logic propagation time to the relatively slow logic circuits employed, the next address register contains an address eight intervals higher than that of the current instruction, thus providing more than 60 microseconds of logic time per instruction. As a programming aid, the bit positions of these registers are rearranged before connection to the transfer bus, so that when addressing the machine in octal form the programmer merely adds 1 for the next instruction. The program address register 8PAR is provided so that return to the main program may be effected after branching to a subroutine area. It holds the next address to be read from the drum upon completion of the subroutine.

The output of the magnetic-drum read amplifiers 8RA delivers the contents of the drum to an eighteen-bit memory output register 8MOR. This register communicates with bus B for input/output purposes and, in addition, forwards its contents to the order register 8OR where the machine instruction currently in use is held. Two registers are needed here, as some of the operation codes require the simultaneous use of two words from the memory.

The input registers receive data from the exchange units and appear on transfer bus B. These registers are expandable in blocks of ten bits each; five such registers (50 bits) are used in a typical installation, and up to seven may be provided within the current addressing scheme.

The command registers receive data from drum storage and forward it to the exchange units under test. Also expandable in groups of ten bits, four such registers, of a possible seven, are used in a typical installation.

The input/output register 8IO provides a link between the input/output device and the control center processor. Directly associated with this eighteen-bit register is a rather complex input/output control circuit, bearing responsibility for code conversion and timing needed at the interface, to permit use of the FRIDEN FLEXOWRITER as an input/output medium.

The scan register 8SR carries, in coded form, the identity of the unit being tested; in addition, the contents of this register provide an entry address to the proper diagnostic routine for the unit under test.

The auxiliary register 8AR provides a link between the two transfer buses to increase the control center's versatility as a data-processing machine. It also contains provisions for incrementing its contents by "1" on demand so that simple counting operations may be performed, and in addition it serves as a register for the magnetic drum writing amplifiers.

Most of the logic required from the control center is housed in the processor control circuit 8PC. This segment performs the following functions:

(1) Controls set and reset pulses to all registers
(2) Contains the comparison circuits used in branch instructions
(3) Decodes and interprets all operation codes
(4) Controls the two transfer buses

CONTROL CENTER PROGRAM WORD

The program word for the control center consists of 18 bits. Six bits are devoted to the operation code and the remaining 12 bits define the memory address. Programming is done in octal form—two digits for the operation code and four digits for address—yielding a possible 64 operation codes and an addressing capability of 4096 words. In a typical exchange, 20 bits are actually set aside for control center operation, to allow memory expansion to 16,000 words, should this prove beneficial as programs are evolved. The structure of the operation code is presented in Table I. Twenty-two operation codes have been assigned in the processor, consuming 43 of the 64 available combinations. Seven of these codes are used to cover input/output demands for printing either alphabetic or numeric information, writing on the drum from either tape-reader or keyboard, and controlling the length of the record to be handled. Three of the operation codes shown in Table I are defined by their first digit alone; in this case, the second digit is used to define the register to be used (in the case of LCR), or the conditions of comparison (for the operations BRE and BRO). The branch instructions require the use of two memory words for execution, one word containing the branch address and the other the comparison data. The remaining operation codes establish the necessary control functions for stored-program operation.

TABLE IA

Program Word

| P | R | Q | |
|---|---|---|---|
| | | A | B |
| ←OP Code→ | | ←Address→ | |
| ←18 bits→ | | | |

| Operation | Mnemonic | Octal | | Word Format | Action |
|---|---|---|---|---|---|
| | | P | R | | |
| Halt | HLT | 0 | 0 | A | Program stop. |
| Go To Q | GTQ | 0 | 1 | B | Take next instruction from location Q. |
| Clear Register | CRQ | 0 | 2 | C | Reset Register defined by Q. |
| Return Execute | REX | 0 | 3 | A | Take next instruction from location given in PAR. |
| Increment | INQ | 0 | 4 | A | Add 1 to contents of AXR. |
| Transfer Keyboard | TKR | 0 | 5 | C | Write from Keyboard into Register "Q." |
| No Operation | NOC | 0 | 6 | A | Take next instruction from NAR. |
| Execute | EXQ | 0 | 7 | B | Store NAR in PAR, take next instruction from Q. |
| Transfer Register | TRR | 1 | 0 | D | Translate contents of Reg $Q_A$ to $Q_B$. |
| Store Register | SRQ | 1 | 4 | B | Write on drum, contents of AXR at Q. |
| Print Record number | PRN | 2 | 0 | B | Print numeric, beginning at Q, until GTQ is sensed in OR. |
| Print Record alpha | PRA | 2 | 2 | B | Same as PRN, except alphabetic print. |
| Write Keyboard | WKQ | 2 | 4 | B | Write on drum from Keyboard, beginning at location Q. |
| Write Tape | WTQ | 2 | 6 | B | Same as WKQ, except tape reader. |
| Dump | DPQ | 3 | 0 | B | Print numeric from Q until console stop. |
| Print Register | PRQ | 3 | 2 | C | Print numeric register defined by Q. |
| Print Word | PNQ | 3 | 4 | B | Print word at location Q. |
| Load Register | LRQ | 3 | 6 | B | Load word at location Q into AXR. |
| Load Command | LCR | 4 | ------ | F | Load Q into command register. |
| Branch Indicator | BRI | 5 | 0 | E | Branch if signal defined by Q is true. |
| Branch Odd | BRO | 6 | ------ | G | Compare Q with IR branch if unequal. |
| Branch Even BRE | ------------ | 7 | ------ | G | Compare Q with IR branch if equal. |

TABLE IB

| Format | P | R | QA | QB |
|---|---|---|---|---|
| A | OP Code | | Not used | |
| B | OP Code | | Drum Address | |
| C | OP Code | | Not used | Reg. Ident. |
| D | OP Code | | Reg. Ident. | Reg. Ident. |
| E Mor | Not used | | Branch address | |
| E Or | CP Code | | Data | |

TABLE IC

| Format | P | R | QA | QB |
|---|---|---|---|---|
| F | OP Code | Reg. Ident. | Date | |
| G Mor | Not used | Comp. Pattern | Branch Address | |
| G Or | OP Code | Reg Ident. | Data | |

TROUBLE DETECTION

Each of the E–A–X system units contains wired logic based upon a sequential progression of events. The logic has as many "states of being" as there are serial tasks for it to perform. In all cases, progression from one state to another is conditional on successful completion of the preceding task. This design concept forms a very powerful tool for fault detection; if the logic attempts to take an illogical action, further progression is blocked and the control center is called in for fault analysis. The position of the unit's sequence-state counter is the first element investigated by the control center diagnostic program and, in many cases, the information thus gained brings the control center very near the degree of fault localization required.

Programs used in the control center are written by the circuit designers for each unit. The field maintenance man has then the advantage of the diagnostic approach and the intimate knowledge of circuit detail possessed by the original designer. For the most part, the diagnostic routines achieve fault-localization by using a "black box" technique.

For each of the sequence states of the unit, the circuit designer divides the logic into a number of "black boxes," each grouping containing a number of logic elements on ten printed circuit cards or less. The output drive pattern is forwarded through access circuits contained in the unit to the control center processor, where this bit pattern is compared with the expected pattern stored in the diagnostic program. If the proper pattern is not present at the output, and a similar comparison at the input succeeds, the fault has been localized and a diagnostic report, in coded form, is printed at the control center console. If the proper pattern is not present at either input or output, this process is repeated with preceding "black boxes" until the fault is located.

A typical fault report consists of four basic elements, as shown in Table II. The branch instruction includes the comparison data, the branch address, the conditions of the comparison, and the identity of the input register used. The data register word has the pattern received from the unit under test; the unit identity is derived from the scan register of the control center processor, and denotes the unit under test. The program address is obtained from the memory register and serves as a key to the card location dictionary. Only the essential, numeric, elements of the fault report are presented here. It may, of course, be dressed by up rearrangement, column headings, etc., to be more easily interpreted.

TABLE II

FAULT REPORT

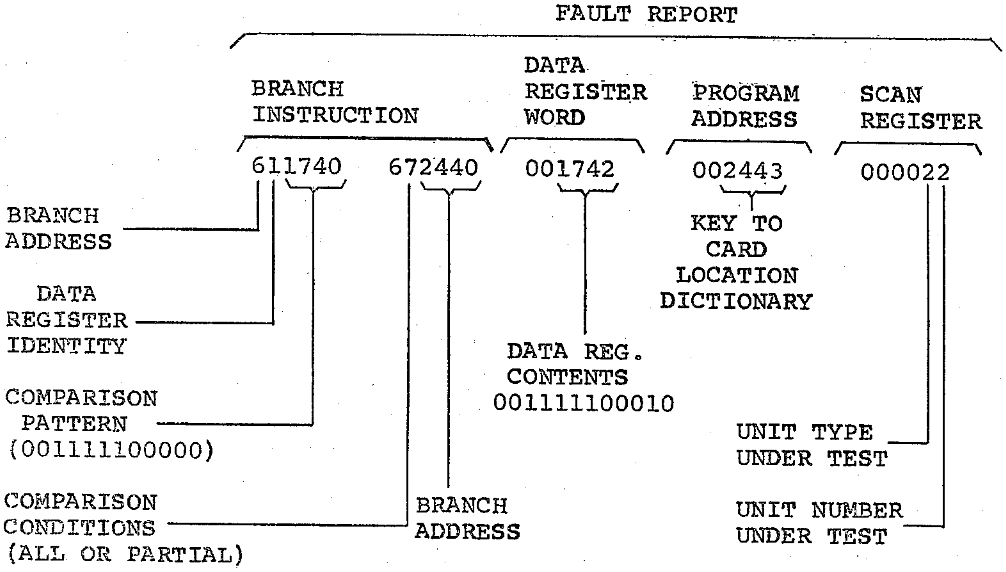

TRAFFIC RECORDING AND DISPLAY

The observation of traffic flow and its distribution in the switching system is of great importance to the operating telephone company. Traffic information is necessary to determine the quality of service being offered to the subscribers, whether certain sections of the system are being overloaded, and to predict the type and quantity of equipment required for future expansion.

The control center traffic display uses a bank of neon lamps as bi-stable indicator devices. It communicates with the control center via the control center access cable and is equipped with a number of lamp-firing circuits, including firing and sustaining voltage supplies. Means are provided to select the display lamps in groups of ten, reducing the number of firing circuits required. With proper programming and access provisions, these lamps may be connected to any group of link or trunk busy/idle tests leads.

To serve as an illustration of the technique employed, FIGURE 9 shows the display unit and its connections to the line group marker while observing traffic occupancy of the links between the cross-point matrix stages. If we consider the B–C links of the line group, it is apparent that all originating and terminating traffic within this group of 1000 lines is indicated by the occupancy of these 300 links. Further, if the links are considered 30 at a time, traffic to and from a given group of 100 lines may be studied.

The display lamps are each connected to a source of sustaining voltage through a load resistor. The opposite sides of the lamps are grounded through a normally closed contact so that the power to all lamps may be interrupted when it is required to extinguish them. The lamps are connected, ten at a time, through a lamp-group selection circuit to ten firing circuits, each capable of applying firing potential to a lamp when its input is driven. Under program control, the firing circuits are connected to the proper points via the control center access cable. The 9US display unit select relay of the line group marker access circuit is operated to connect the group connect relays 9GC1 and 9GC2 to the command bus of the control center access cable at the marker end, and the 9DUC display unit connect relay of the display unit access circuit is operated to also connect the 9DGC display group connect relay to the command bus. Access to the B–C links within the line group is obtained via the B–C link selector of the line group marker. In order to prevent the marker from attempting to use this portion of the link selector it is necessary to block the marker's access to the chosen hundreds group while the display system is engaged. The display system requires some 20 to 40 milliseconds to obtain the link occupancy, but since this action need not take place more often than every ten seconds the additional holding time requirements imposed on the line group marker do not cause any difficulty.

The selection and sequencing of the display unit is done with program instructions from the control center and, as the busy/idle signals developed are also available to the control center processor, printed and punched permanent records of traffic information may also be developed.

The display unit may be used in a number of ways:

(1) By switching the display unit over different trunk and link groups during the busy periods, the distribution of traffic by groups may be observed and traffic loads balanced.

(2) If the lamps are not extinguished between scan cycles but are allowed to remain on one group of links through the busy period the probability that each link has been in use at least once is very great. Any dark display lamp casts suspicion that the associated link cannot, for some reason, be selected.

(3) Using the display during very light traffic periods permits detection of permanently busy positions.

TRANSLATION UPDATING

Included in the control center console is a section devoted to translator updating. A display unit is provided to monitor visually the read and write buffer registers of the selected magnetic drum translator. Entry to the translator is effected through the FRIDEN FLEXOWRITER and its associated tape handling equipment, which is shared by the control center processor and the translator updating circuits. The input/output control portion of the control center provides necessary code conversions for these two services and resolves the interface between them. Using the FLEXOWRITER as an addressing device, the following functions may be performed:

(1) The translation of any directory number may be obtained, displayed, and printed for verification.

(2) The directory number associated with any translation may be displayed and printed.

(3) A translation may be displayed and a new modified translation accepted for entry on the drum which is then written, re-read, and verified ("updating mode").

(4) Translation information may be accepted for writing from punched paper tape, and entered in storage sequentially. Each entry is automatically verified after insertion ("load routine").

AUTOMATIC ROUTINING FUNCTIONS

It is apparent that with the amount of flexibility existing in the control center a large number of automatic routine test arrangements are possible. The tests include control center programming and support hardware for the more common routine functions, such as:

(1) A test call routine, consisting of placing calls from each subscriber's line equipment to test numbers and verifying proper completion.

(2) An outside-plant test routine to test each outside cable pair for leakage, continuity, and foreign potential.

While I have described above the principles of my invention in connection with specific apparatus, it is to be clearly understood that this description is made only by way of example and not as a limitation to the scope of my invention.

What is claimed is:

1. In an electronic system having a plurality of different circuit units operating in predetermined programs individually and in cooperation with each other, wherein each circuit unit includes a program function timing means operated to indicate a failure to complete said predetermined program: a fault indicator for use therewith comprising; associating means operated upon a failure indication from a particular circuit unit for temporarily associating therewith, process control means, said associating means including means operated upon associating with a circuit unit to indicate to said process control the type of unit associated therewith, test program storage means comprising a magnetic drum, means in said process control operated in response to said type indication to interrogate said storage means for an appropriate test program, a common test access path connectable to each circuit unit, connecting means in each circuit unit operable to connect said circuit unit to said test access path, first control means in said process control means operated upon said associating means associating with a circuit unit to operate said particular connecting means, transfer means in said control means thereafter operated to apply said test program to said circuit unit, coincidence means in said control means, second control means in said process control means operated after application of said test program to said circuit unit to apply said circuit unit output and part of said storage means program to said coincidence means, and other means in said control circuit operated upon coincidence of said two inputs to said coincidence means to indicate the faulty condition.

2. In an electronic system having a plurality of different circuit units operating in predetermined programs individually and in cooperation with each other, wherein each circuit unit includes a means operated to indicate a failure to complete said predetermined program; a fault indicator for use therewith comprising; associating means operated upon a failure indication from a particular circuit unit for temporarily associating therewith, process control means, said associating means including means operated upon association with a circuit unit to indicate to said process control the type of unit associated therewith, test program storage means comprising a magnetic drum, means in said process control operated in response to said type indication to interrogate said storage means for an appropriate test program, a common test access path connectable to each circuit unit, connecting means in each circuit unit operable to connect said circuit unit to said test access path, first control means in said process control means operated upon said associating means association with a circuit unit to operate said particular connecting means, transfer means in said control means thereafter operated to apply a first part of said test program to said circuit unit, coincidence means in said control means, second control means in said process control means operated after application of said test program to said circuit unit to apply said circuit unit output and a second part of said test program to said coincidence means, third control means in said process control means operated to a first state upon not finding coincidence of said two inputs to said coincidence means to interrogate said storage means for a second test program.

3. In an electronic system having a plurality of different circuit units operating in predetermined programs individually and in cooperation with each other, wherein each circuit unit includes a program function timing means operated to indicate a failure to complete said predetermined program: a fault indicator for use therewith comprising; associating means operated upon a failure indication from a particular circuit unit for temporarily associating therewith, process control means, said associating means including means operated upon associating with a circuit unit to indicate to said process control the type of unit associated therewith, test program storage means comprising a magnetic drum, means in said process control operated in response to said type indication to interrogate said storage means for an appropriate test program, a common test access path connectable to each circuit unit, connecting means in each circuit unit operable to connect said circuit unit to said common test access path, first control means in said process control means operated upon said associating means association with a circuit unit to operate said particular connecting means, transfer means in said control means thereafter operated to apply a first part of said test program to said circuit unit, coincidence means in said control means, second control means in said process control means operated after application of said test program to said circuit unit to apply said circuit unit output and a second part of said test program to said coincidence means, third control means in said process control means operated to a first state upon not finding coincidence of said two inputs to said coincidence means to interrogate said storage means for a second test program, and other means thereafter operated to reoperate said transfer means, said second control means and said third control means in accord with said second test program, said third control means operated to a second state upon finding coincidence of said two inputs to said coincidence means to indicate said faulty condition, record printing means, said record printing means thereafter operated by said process control means to print a record of said fault condition.

4. In a communication switching system having a plurality of switching groups connected by a plurality of links, with each group including a plurality of crosspoint switching devices arranged in coordinate matrices, and controlled by a plurality of different circuit units operating in predetermined programs individually and in cooperation with each other, each circuit unit including a program malfunction means operated to indicate said condition, marker apparatus included among said circuit units for controlling the establishment of connections through said crosspoints and between said switching groups via said links, a fault indicator for use in said system comprising; associating means operated upon a malfunction indication from a particular circuit unit for temporarily associating therewith, process control means, said associating means including means operated upon association with a circuit unit to indicate to said process control the type of unit associated therewith, test program storage means comprising a magnetic drum, means in said process control operated in response to said type indication to interrogate said storage means for an appropriate test program, a common test access path from said fault indicator connectable to each circuit units inputs and outputs, connecting means in each circuit unit operable to connect said circuit unit to said common test access path, first control means in said process control means operated upon said associating means association with a circuit unit to operate said particular connecting means, transfer means in said control means thereafter operated to apply a first part of said test program to said circuit unit input, coincidence means in said control means, second control means in said process control means operated after application of said test program to said circuit unit to apply said circuit unit output, and a second part of said test program to said coincidence means, third control means in said process control means operated to a first state upon not finding coincidence of said two inputs to said coincidence means to interrogate said storage means for a second test program, and other means thereafter operated to reoperate said transfer means, said second control means and said third control means, in accord with said second test program, said third control means operated to a second state upon finding coincidence of said two inputs to said coincidence means to indicate said faulty condition, traffic supervisory means comprising a plurality of indicator lamps operatively associated with said fault indicator, primary access means, key means in said fault indicator operated to control said primary access means to condition said associating means to associate with said connecting means to connect said marker means and said traffic supervisory means with said test access path, connect means in said traffic supervisory means thereafter operated to connect said lamps to said markers via said common test access path at periodic intervals, and operate circuit means operated to light each lamp corresponding to a link in use during said connection to said marker.

5. In a communication switching system having a plurality of switching groups connected by a plurality of links, with each group including a plurality of crosspoint switching devices arranged in coordinate matrices, and controlled by a plurality of different circuit units operating in predetermined programs individually and in cooperation with each other, each circuit unit including a program malfunction means operated to indicate said condition, marker apparatus included among said circuit units for controlling the establishment of connections through said crosspoints and between said switching groups via said links, a fault indicator for use in said system comprising; associating means operated upon a malfunction indication from a particular circuit unit for temporarily associating therewith, process control means, said associating means including means operated upon association with a circuit unit to indicate to said process control the type of unit associated therewith, program means in said process control operated in response to said type indication to select an appropriate test program, a common test access path connectable to each circuit unit, connecting means in each circuit unit operable to connect said circuit unit to said common test access path, control means in said process control means operated upon said associating means association with a circuit unit to operate said particular connecting means, test means in said control means thereafter operated to apply said test program to said unit, traffic supervisory means comprising a plurality of indicator lamps operatively associated with said fault indicator, primary access means, key means in said fault indicator operated to control said primary access means to condition said associating means to associate with said connecting means to connect said marker means and said traffic supervisory means with said test access path, connect means in said traffic supervisory means thereafter operated to connect said lamps to said markers via said common test access path at periodic intervals, and operate circuit means operated to light each lamp corresponding to a link in use during said connection to said marker.

6. In a communication switching system having a plurality of switching groups connected by a plurality of links, with each group including a plurality of crosspoint switching devices arranged in coordinate matrices, and controlled by a plurality of different circuit units operating in predetermined programs individually and in cooperation with each other, each circuit unit including a program malfunction means operated to indicate said condition, marker apparatus included among said circuit units for controlling the establishment of connections through said crosspoints and between said switching groups via said links, a fault indicator for use in said system comprising; associating means operated upon a malfunction indication from a particular circuit unit for temporarily associating therewith, process control means, said associating means including means operated upon association with a circuit unit to indicate to said process control the type of unit associated therewith, program means in said process control operated in response to said type indication to select an appropriate test program, a common test access path connectable to each circuit unit, connecting means in each circuit unit operable to connect said circuit unit to said common test access path, control means in said process control means operated upon said associating means association with a circuit unit to operate said particular connecting means, test means in said control means thereafter operated to apply said test program to said unit, traffic supervisory means comprising a plurality of indicator lamps operatively associated with said fault indicator, primary access means, key means in said fault indicator operated to control said primary access means to condition said associating means to associate with said connecting means to connect said marker means and said traffic supervisory means with said test access path, connect means in said traffic supervisory means thereafter operated to connect said lamps to said markers via said common test access path at periodic intervals, and operate circuit means operated to light each lamp corresponding to a link in use during said connection to said marker, record printing means, said process control means further operated to control said printing means to print a record of link conditions simultaneously with the display on said lamp.

References Cited by the Examiner

UNITED STATES PATENTS

| | | | |
|---|---|---|---|
| 2,925,591 | 2/1960 | Burkhart | 324—73 |
| 3,159,721 | 12/1964 | Deming et al. | 179—175.2 |
| 3,219,927 | 11/1965 | Topp et al. | 324—73 |

KATHLEEN H. CLAFFY, *Primary Examiner.*

J. W. JOHNSON, R. MURRAY, *Assistant Examiners.*